United States Patent [19]
Kataoka

[11] Patent Number: 5,635,993
[45] Date of Patent: Jun. 3, 1997

[54] APPARATUS AND METHOD FOR CONTROLLING WHITE BALANCE OF A CATHODE RAY TUBE PROJECTOR

[75] Inventor: Tohru Kataoka, Tokyo, Japan

[73] Assignee: NEC Corporation, Tokyo, Japan

[21] Appl. No.: 622,119

[22] Filed: Mar. 26, 1996

[30] Foreign Application Priority Data

Mar. 27, 1995 [JP] Japan ................................. 7-67497

[51] Int. Cl.$^6$ ..................................................... H04N 9/73
[52] U.S. Cl. ............................ 348/655; 348/656; 348/658
[58] Field of Search .................................. 348/655, 656, 348/658; 358/29; H04N 9/73

[56] References Cited

FOREIGN PATENT DOCUMENTS

| | | |
|---|---|---|
| 64-27384 | 1/1989 | Japan . |
| 64-27385 | 1/1989 | Japan . |
| 1-170170 | 7/1989 | Japan . |
| 4-129397 | 4/1992 | Japan . |

Primary Examiner—Sherrie Hsia
Attorney, Agent, or Firm—Young & Thompson

[57] ABSTRACT

An input signal is input to a detector and a synchronizing frequency of the input signal is detected by a frequency detector. Then, the number of the horizontal lines per vertical period of the input signal is determined according to the synchronizing frequency by a calculator. A control signal for defocusing an electron beam with which a blue fluorescent substance emits light is generated from a defocus controller according to the number of the horizontal lines of the input signal. Here, a range of control signals is previously stored corresponding to a range of numbers of horizontal lines. A focus signal for exactly focusing the electron beam is added to the control signal output from the defocus controller by an adder. Then, the defocus signal is output tom the adder. The defocus signal is amplified by a focus adjusting amplifier 15. The diameter of the electron beam with which the blue fluorescent substance emits the light is controlled according to the amplified defocus signal by a focus adjusting coil.

15 Claims, 3 Drawing Sheets

APPARATUS AND METHOD FOR CONTROLLING WHITE BALANCE OF A CATHODE RAY TUBE PROJECTOR

BACKGROUND OF THE INVENTION

1. Field of the Invention

The present invention relates to an apparatus and method for controlling the white balance, and more particularly to an apparatus and method for controlling the white balance of a cathode ray, robe (CRT) projector suitable for displaying two or more different types of input signals.

2. Description of the Related Art

Referring to FIG. 1, in a conventional white balance control apparatus, a correction waveform generator 51 generates a defocus signal for defocusing the electron beam for a blue fluorescent substance of a CRT. The defocus signal is amplified by a focus adjusting amplifier 52. The diameter of the electron beam for the blue fluorescent substance is controlled by a focus adjusting coil 53 according to the defocus signal so that the electron beam is defocused.

The luminance characteristic of the blue fluorescent substance is lower than the luminance characteristics of the green and red fluorescent substances corresponding to the anode current of each fluorescent substance used in the CRT projector. Further, the afterglow characteristic of the blue fluorescent substance is different from the afterglow characteristics of the green and red fluorescent substances, that is, the afterglow time of the blue fluorescent substance is shorter than the afterglow time of the other fluorescent substances. CRT projectors using fluorescent substances having these characteristics reduce the color temperature of white in the white balance adjustment. To improve the color temperature of white, the electron beam for the blue fluorescent substance is conventionally defocused.

In the case wherein the conventional white balance control apparatus defocusing the electron beam for the blue fluorescent substance is used in a multi-scan type CRT projector, when the CRT projector displays a video signal whose number of scanning lines is low, the white balance adjustment is effective for improving the color temperature of white. Here, the number of the scanning lines represents the number of the horizontal lines per vertical period.

However, when the CRT projector displays a signal generated from a personal computer (PC) and the like whose the number of scanning lines is high, the density of electrons reaching each fluorescent substance is reduced and, as compared with the case of the video signal whose number of scanning lines is low, the anode current per unit area of each fluorescent substance is reduced. For the luminance characteristic corresponding to the anode current reduction, the characteristic of the blue fluorescent substance is different from the luminance characteristics of the red and green fluorescent substances. In other words, the luminance characteristics of the red and green fluorescent substances reduce in proportion to the anode current reduction, while the luminance characteristic of the blue fluorescent substance almost does not reduce.

Therefore, when a signal having a high number of scanning lines is displayed, the set color temperature becomes high compared with the case wherein a video signal having a low number of scanning lines is displayed.

Further, since the focus of the electron beam for the blue fluorescent substance is defocused, the diameter of the electron beam for the blue fluorescent substance becomes thick compared with the diameter of the electron beams for the red and green fluorescent substances.

Here, a conventional white balance control apparatus having a switch circuit which switches between an exact focus mode where the electron beam is exactly focussed and an over-focus mode where the electron beam for the blue fluorescent substance is defocused, is disclosed in Japanese Patent Application Laid-Open No. 1-170170 and Japanese Patent Application Laid-Open No. 64-27385. Further, another conventional apparatus which independently controls the amplitude value of red, green and blue color signals is described in Japanese Patent Application Laid-Open No. 4-129397.

SUMMARY OF THE INVENTION

It is an object of the present invention to provide an apparatus and method for controlling the white balance which is capable of precisely setting a uniform color temperature corresponding to two or more different types of input signals.

It is another object of the present invention to provide an apparatus and method for controlling white balance which is capable of suitably defocusing the electron beam with which a blue fluorescent substance emits light according to the number of horizontal lines per vertical period of an input signal.

To achieve the above objects, the apparatus and method for controlling white balance of the present invention detects, in a detector means, the number of horizontal lines per vertical period of an input signal. Then, a diameter of an electron beam with which a blue fluorescent substance emits light is controlled, in a controller means, according to the number of horizontal lines detected by the detector means.

BRIEF DESCRIPTION OF THE DRAWINGS

The above and other objects, features and advantages of the present invention will become apparent from the following detailed description taken in conjunction with the accompanying drawings, wherein.

DETAILED DESCRIPTION OF THE PREFERRED EMBODIMENT

Now, an apparatus and method for controlling the white balance according to an embodiment of the present invention will be described in reference to the accompanying drawings.

Figure 2:
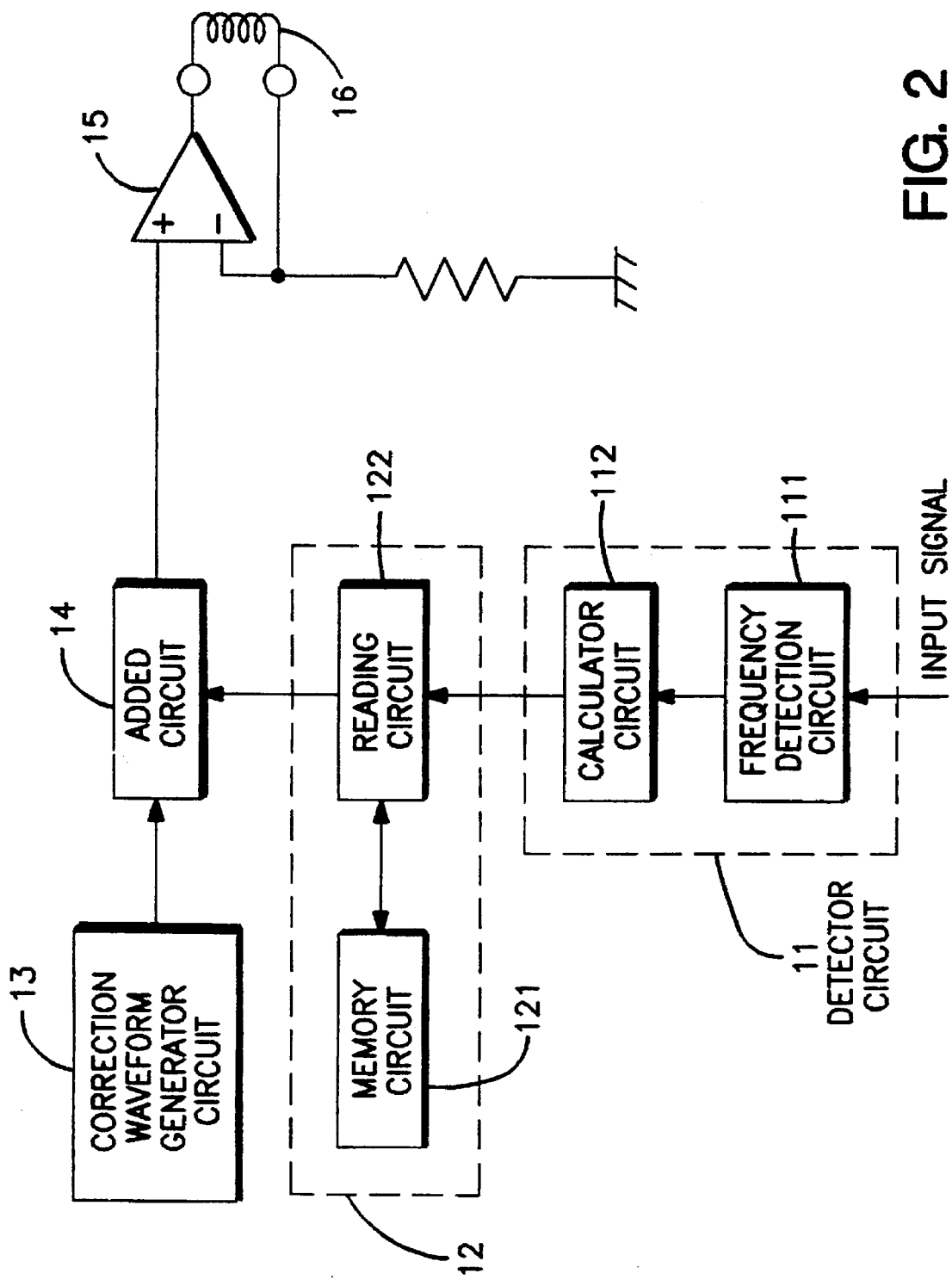
FIG. 2 is a block diagram showing a white balance control apparatus according to an embodiment of the present invention.
Figure 3:
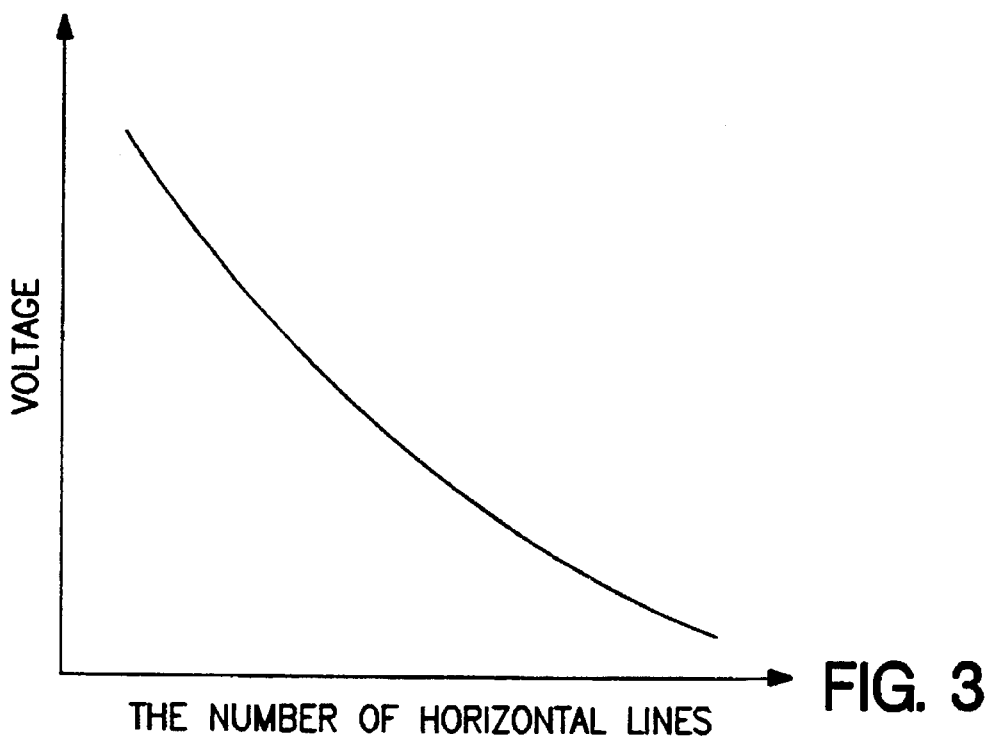
FIG. 3 is a graph showing a control voltage corresponding to the number of scanning lines of an input signal.
Figure 4:
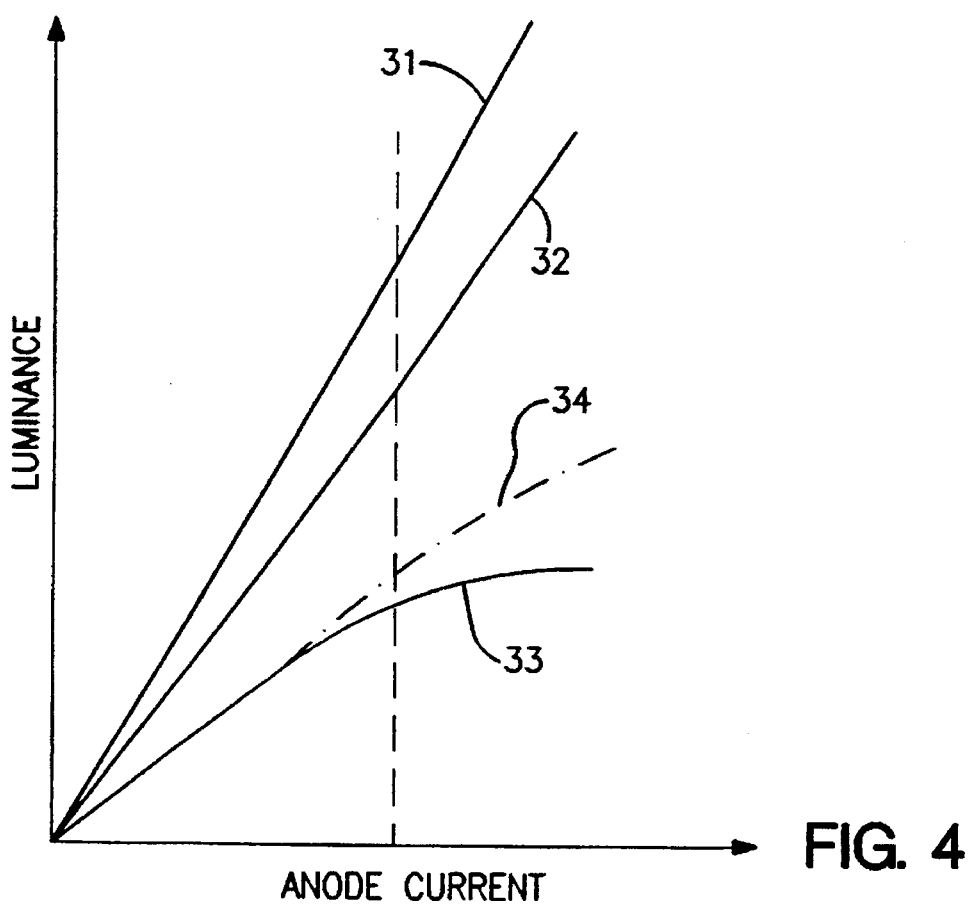
FIG. 4 is a graph showing a luminance characteristic of a CRT corresponding to an anode current.

Referring to FIG. 2, a detector circuit 11 detects the number of horizontal lines per vertical period of an input signal. The detector circuit 11 comprises a frequency detection circuit 111 for detecting a synchronizing frequency of the input signal and a calculator circuit 112 for calculating the number of horizontal lines from the synchronizing frequency detected by the frequency detection circuit 111, A defocus control circuit 12 comprises a memory circuit 121, for example, a read only memory (ROM), and a reading circuit 122, and generates a predetermined control signal corresponding to the number of the horizontal lines of the input signal detected by the detector circuit 11. The diameter of an electron beam with which a blue fluorescent substance emits light is controlled according to the control signal generated from the defocus control circuit 12. A range of control voltage values corresponding to a range of numbers of horizontal lines of the input signal, as shown in FIG. 4, is previously stored in the memory circuit 121. The reading circuit 122 reads the control voltage corresponding to the number of the horizontal lines of the input signal detected by the detector circuit 11 from the memory circuit 121 and outputs the control voltage as the control signal. Here, the relationship between the control voltage and the number of the horizontal lines is shown in FIG. 3. As can be seen in FIG. 3, the amplitude of the control voltage decreases as the number of horizontal lines increases.

A correction waveform generator circuit 13 generates a focus signal for exactly focusing the electron beam with which the blue fluorescent substance emits light.

An adder circuit 14 adds the focus signal generated from the correction waveform generator circuit 13 and the control signal generated from the defocus control circuit 12 and outputs a defocus signal for defocusing the electron beam with which the blue fluorescent substance emits light.

A focus adjusting amplifier 15 amplifies the defocus signal output from the adder circuit 14. A focus adjusting coil 16 controls the diameter of the electron beam with which the blue fluorescent substance emits light according to the amplified defocus signal.

Figure 1:
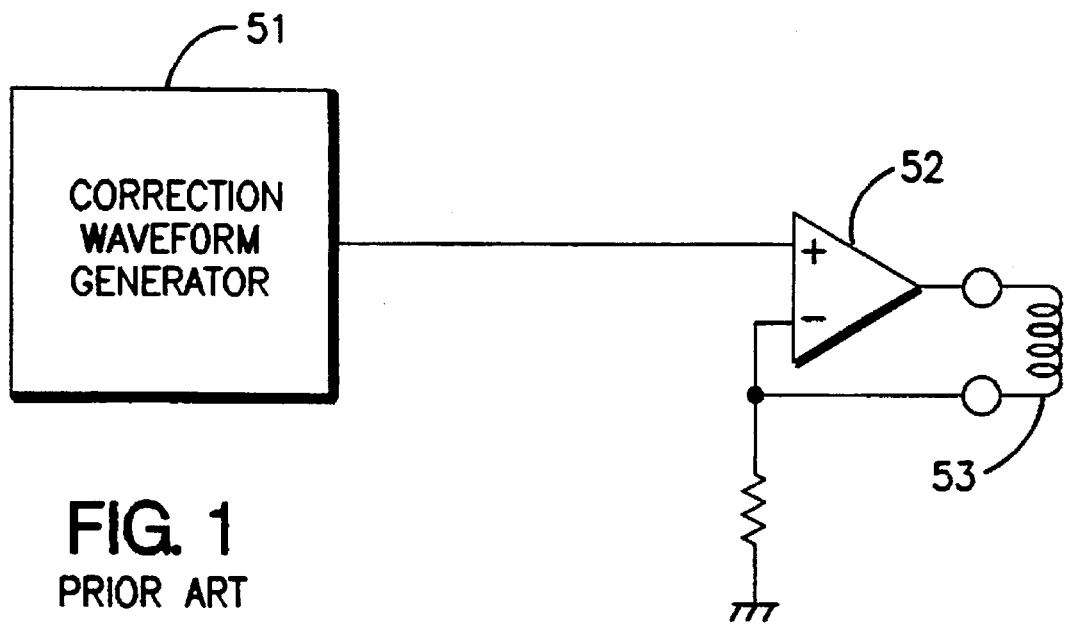
FIG. 1 is a block diagram showing a conventional white balance control apparatus.
Figure 5:
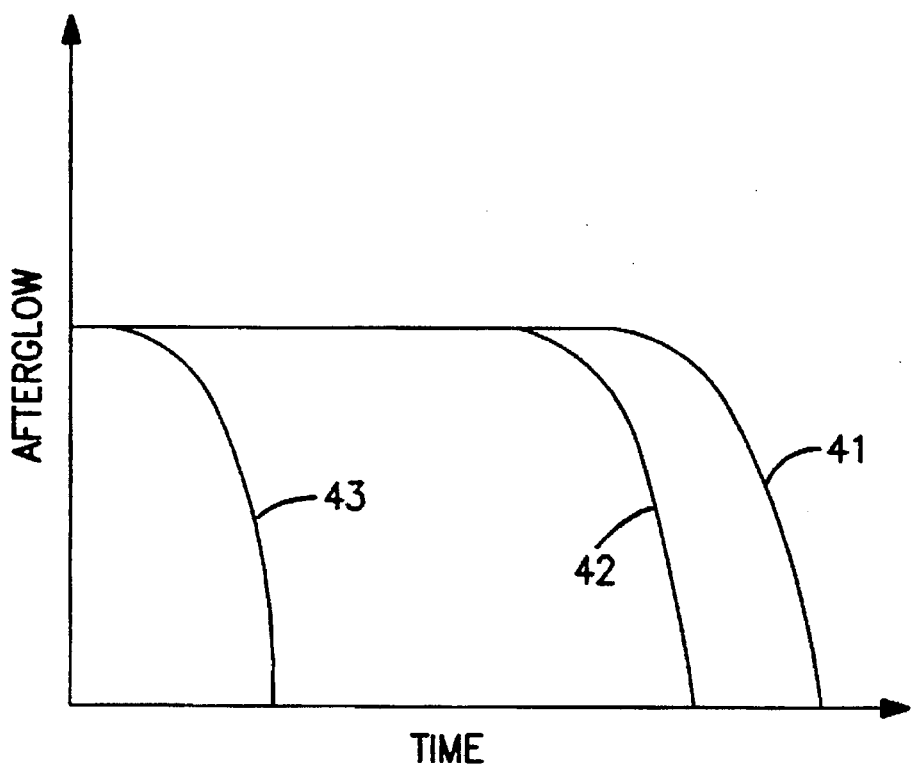
FIG. 5 is a graph showing an afterglow characteristic of a CRT.

As shown in FIG. 4, when three electron beams with which the green, red and blue fluorescent substances emit light respectively are exactly focused, the luminance characteristic 31 of the green fluorescent substance and the luminance characteristic 32 of the red fluorescent substance vary linearly, while the luminance characteristic 33 of the blue fluorescent substance tends to saturate in a high-current area. In addition, as shown in FIG. 5, the afterglow time of the afterglow characteristic 43 of the blue fluorescent substance is very short compared to the afterglow characteristics 41 and 42 of the green and red fluorescent substances. In the case wherein the green, red and blue fluorescent substances having these characteristics are used for an exact focusing operation, the color temperature of white becomes low in the white balance adjustment.

To improve the color temperature of this white balance adjustment, there is a need to alleviate the luminance saturation characteristic of the blue fluorescent substance. The control voltage shown in FIG. 3 is used for alleviating the luminance saturation characteristic and for making the defocus characteristic 34 the luminance characteristic of the blue fluorescent substance.

Next, the operation of the white balance control apparatus of the embodiment will be described.

The input signal is input to the detector circuit 11, and the synchronizing frequency of the input signal is detected by the frequency detection circuit 111. Then, the number of horizontal lines of the input signal is determined according to the synchronizing frequency, by the calculator circuit 112.

The control signal for defocusing the electron beam with which the blue fluorescent substance emits light is generated from the defocus control circuit 12 according to the number of the horizontal lines of the input signal. The control signal is previously set corresponding to the number of the horizontal lines.

The focus signal for exactly focusing the electron beam with which the blue fluorescent substance emits light generated from the correction waveform generator circuit 13 is added to the control signal output from the defocus control circuit 12 by the adder circuit 14. Then, the defocus signal is output from the adder circuit 14.

The defocus signal output from the adder circuit 14 is amplified by the focus adjusting amplifier 15. The diameter of the electron beam with which the blue fluorescent substance emits light is controlled according to the amplified defocus signal by the focus adjusting coil 16.

In accordance with the aforementioned embodiment of the present invention, control voltages corresponding to the number of horizontal lines are previously stored, and the electron beam with which the blue fluorescent substance emits light is suitably defocused according to the prestored control voltage corresponding to the detected number of horizontal lines of the input signal. Therefore, uniform whim balancing and high fine focusing are obtained for two or more types of input signals.

Further, there is no need to control the cathode amplitude voltage for the blue fluorescent substance and to reset the color temperature for every change of the type of input signal.

While the invention has been described with reference to a preferred embodiment thereof, the invention is not to be limited to the details given herein, but may be modified within the scope of the appended claims. For example, although the aforementioned embodiment has been described with reference to an electromagnetic convergence CRT, the invention is also applicable to an electromagnetic-electrostatic convergence CRT and an electrostatic convergence CRT.

I claim:

1. An apparatus for controlling a white balance of a cathode ray tube comprising:

first detector means for detecting a number of horizontal lines of an input signal; and first controller means for controlling a diameter of an electron beam with which a blue fluorescent substance emits light according to said detected number of horizontal lines.

2. The apparatus as claimed in claim 1, wherein said first detector means comprises:

second detector means for detecting a synchronizing frequency of the input signal; and calculator means for calculating the number of the horizontal lines of the input signal according to the synchronizing frequency detected by said second detector means.

3. The apparatus as claimed in claim 1, wherein said first controller means comprises:

storage means for storing a range of control signals corresponding to a range of numbers of the horizontal lines;

reading means for reading a control signal from said storage means corresponding to the number of horizontal lines of the input signal detected by said first detector means, and for outputting said control signal; and second controller means for controlling the diameter of the electron beam with which the blue fluorescent substance emits the light according to the control signal output from said reading means.

4. The apparatus as claimed in claim 3, wherein said range of control signals is a range of control voltages for controlling a defocus value of the electron beam with which the blue fluorescent substance emits the light.

5. The apparatus as claimed in claim 4, wherein said stored control voltages within said stored range of control voltages decrease in amplitude with increase of the number of the horizontal lines.

6. A method for controlling a white balance of a cathode ray tube comprising the steps of:

detecting a number of horizontal lines per vertical period of an input signal; and controlling a diameter of an electron beam with which a blue fluorescent substance emits light according to said number of the horizontal lines.

7. The method as claimed in claim 6, wherein said detecting step comprises the steps of:

detecting a synchronizing frequency of the input signal;

calculating said number of horizontal lines according to the detected synchronizing frequency.

8. The method as claimed in claim 6, wherein said controlling step comprises the steps of:

reading a control signal corresponding to said number of the horizontal lines of the input signal from a storage means wherein a range of control signals is previously stored corresponding to a range of numbers of the horizontal lines; and controlling the diameter of the electron beam with which the blue fluorescent substance emits the light according to the control signal.

9. An apparatus for controlling a white balance of a cathode ray tube projector, comprising;

first generator means for generating a first signal for exactly focusing an electron beam with which a blue fluorescent substance emits light;

second generator means for generating a second signal for defocusing the electron beam with which the blue fluorescent substance emits the light;

adder means for adding said first signal to said second signal to produce a third signal; and controller means for controlling a diameter of the electron beam according to the third signal.

10. The apparatus as claimed in claim 9, wherein said second generator means comprises:

first detector means for detecting a number of horizontal lines of an input signal; and output means for outputting the second signal corresponding to the number of the horizontal lines per vertical period of the input signal detected by said detector means.

11. The apparatus as claimed in claim 10, wherein said first detector means comprises:

second detector means for detecting a synchronizing frequency of the input signal; and calculator means for calculating the number of the horizontal lines of the input signal according to the synchronizing frequency detected by said second detector means.

12. The apparatus as claimed in claim 10, wherein said output means comprises:

storage means for storing a range of second signals corresponding to a range of numbers of the horizontal lines per vertical period; and reading means for reading, from said stored range of second signals, the second signal corresponding to the number of the horizontal lines of the input signal detected by said first detector means.

13. The apparatus as claimed in claim 10, wherein said controller means comprises:

amplifier means for amplifying the third signal; and coil means for controlling the diameter of the electron beam with which the blue fluorescent substance emits the light according to the third signal amplified by said amplifier means.

14. The apparatus as claimed in claim 12, wherein said second signals within said stored range of second signals decrease in amplitude with increase of the number of the horizontal lines.

15. The apparatus as claimed in claim 12, wherein said storage means is a read only memory.

* * * * *